US005688217A

United States Patent [19]
Izume

[11] Patent Number: 5,688,217
[45] Date of Patent: Nov. 18, 1997

[54] ROLLERS

[75] Inventor: Masayuki Izume, Kyoto, Japan

[73] Assignee: I.Mar Planning, Inc., Kyoto, Japan

[21] Appl. No.: 546,569

[22] Filed: Oct. 20, 1995

[30] Foreign Application Priority Data

Oct. 25, 1994 [JP] Japan ................................. 6-260047

[51] Int. Cl.⁶ .................................................. B23P 15/00
[52] U.S. Cl. .................................... 492/39; 492/42
[58] Field of Search ........................... 492/39, 57, 60, 492/49, 42

[56] References Cited

U.S. PATENT DOCUMENTS 3,854,646  12/1974  Dörfel et al. .

FOREIGN PATENT DOCUMENTS 0 579 839  1/1994  European Pat. Off. .
2 416 377  8/1979  France .
2 516 018  5/1983  France .
38 11 337  10/1989  Germany .
3811337  10/1989  Germany .
6 071 863  3/1994  Japan .

*Primary Examiner*—Irene Cuda
*Attorney, Agent, or Firm*—Armstrong, Westerman, Hattori, McLeland & Naughton

[57] ABSTRACT

A roller comprises a straight support member, a plurality of hollow cylindrical roller members arranged axially thereof and having the support member inserted therethrough, and a position change-over device provided for each of the roller members. Each roller member is provided around the support member so as to be rotatable relative to the support member and movable relative thereto in a plane orthogonal to the axial direction, and the change-over devices are adapted to shift the roller members respectively each in the plane orthogonal to the axial direction of the roller member. A connecting member is interposed between opposed end faces of each two adjacent roller members for preventing the two adjacent roller members from moving circumferentially thereof relative to each other while permitting relative movement of the two adjacent roller members in the plane orthogonal to the axial direction.

9 Claims, 7 Drawing Sheets

ROLLERS

BACKGROUND OF THE INVENTION

The present invention relates to rollers useful, for example, for printing presses as the vibrating roller of the inking arrangement of the press, as the water quantity adjusting roller of the water supply device thereof, as the tension roller of the roll paper feeder thereof, etc.

For example, vibrating rollers for use in inking arrangements for printing presses are disclosed in Jp-A-71862/1994 and Jp-A-71863/1994. These known rollers comprise a straight support member, a plurality of hollow cylindrical roller members arranged axially thereof and having the support member inserted therethrough, and a position change-over device provided for each of the roller members. Each of the roller members is disposed around the support member so as to be rotatable relative to the support member and movable relative thereto in a plane orthogonal to the axial direction. The position change-over devices are adapted to shift the respective roller members each in the plane orthogonal to the axial direction of the roller member. The vibrating roller is interposed between an ink fountain roller and an ink distributing roller. The roller members are individually shiftable to a position where they are in contact with the fountain roller and away from the distributing roller, or alternatively to a position where they are in contact with the distributing roller and away from the fountain roller. The roller members are rotated by frictional contact with the fountain roller or distributing roller. While the roller member is in contact with the fountain roller, ink is transferred from the fountain roller to the roller member. While the roller member is in contact with the distributing roller, the ink is transferred from the roller member to the distributing roller. The ink transferred to the distributing roller is further supplied to a printing surface via a plurality of other ink distributing rollers. The roller members are individually adjusted as to the duration of contact of the member with the fountain roller or the distributing roller, whereby the amount of ink to be supplied to the printing surface is controllable to a desired value at the position of each roller member, i.e., from position to position widthwise of the printing surface.

Although the roller members are individually shiftable in a direction orthogonal to the axis of the member, each roller member rotates independently of another roller member, so that the conventional vibrating roller described has the following problem.

While the roller member of the vibrating roller is rotated by the fountain roller or distributing roller in frictional contact therewith, the roller member is likely to slip relative to the fountain or distributing roller, and the slip ratio varies with the frictional force, i.e., the contact pressure. Further because the roller has machining errors or assembling errors, it is extremely difficult to cause all the roller members to contact the fountain roller or distributing roller under equal pressures. For this reason, the slip ratio involved in the contact between the fountain roller or the distributing roller and the roller members is likely to differ with some roller members, consequently producing a difference in the speed of rotation between the roller members. Such a speed difference, if occurring between the roller members, entails a variation in the quantity of ink to be transferred from the fountain roller to the distributing roller by each of the roller members, presenting difficulty in controlling the quantity of ink to be supplied to the printing surface accurately to the desired value for each roller member.

The same problem as described is also encountered in the case where the roller member of the vibrating roller is shiftable to a position where the member is always in contact with the distributing roller and away from the fountain roller, or alternatively to a position where the member is in contact with the two rollers.

The water supply device for use in printing presses comprises a water quantity adjusting roller disposed between a water fountain roller and an applicator roller. The adjusting roller can be of the same construction as the vibrating roller described, but the same problem is also experienced in this case.

SUMMARY OF THE INVENTION

An object of the present invention is to overcome the foregoing problem and to provide a roller comprising roller members which are individually shiftable in a direction orthogonal to the axial direction of the member and which are rotatable always at the same speed.

Another object of the invention is to provide a roller comprising roller members which are reliably shiftable.

Still another object of the invention is to provide a roller of the type described wherein the roller members are rotatable with greatly diminished resistance and which requires no maintenance procedure.

The present invention provides a roller which comprises a straight support member, a plurality of hollow cylindrical roller members arranged axially thereof and having the support member inserted therethrough, and a position change-over device provided for each of the roller members, each of the roller members being provided around the support member so as to be rotatable relative to the support member and movable relative thereto in a plane orthogonal to the axial direction, the position change-over devices being adapted to shift the roller members respectively each in the plane orthogonal to the axial direction of the roller member, the roller being characterized in that a connecting member is interposed between opposed end faces of each two adjacent roller members for preventing the two adjacent roller members from moving circumferentially thereof relative to each other while permitting relative movement of the two adjacent roller members in the plane orthogonal to the axial direction.

The roller members are individually shiftable by the respective position change-over devices, each in a plane orthogonal to the axial direction of the roller member. The connecting member, interposed between each two adjacent roller members, permits these members to move relative to each other in the plane orthogonal to the axial direction of the member and therefore will not interfere with the shift of the individual roller members in the plane. All the roller members are rotatable together at the same speed because the connecting member prevents the circumferential relative movement of each two adjacent roller members. Consequently, the roller members are individually shiftable in a direction orthogonal to the axial direction thereof and are nevertheless rotatable without any speed difference therebetween.

As stated above, the roller members of the roller of the invention are individually shiftable in a direction orthogonal to the axis thereof and yet rotatable at the same speed at all times. Accordingly, when used as the vibrating roller of inking arrangement of the printing press, the present roller is operable free of the problem that would result from a rotational speed difference between the roller members.

The connecting member may have a desired shape or construction insofar as the member permits the two adjacent roller members to move relative to each other only in the plane orthogonal to the axis of the roller member. For example, the connecting member is in the form of an apertured disk. The distance between the roller members can then be diminished, rendering the roller small-sized in its entirety.

For example in this case, between two symmetric portions of the connecting member on a first diameter thereof and the end face, opposed to these portions, of one of the two adjacent roller members, first guide means is provided for permitting the above-mentioned one roller member and the connecting member to move relative to each other only in the direction of the first diameter, and between two symmetric portions of the connecting member on a second diameter thereof and the end face, opposed to these portions, of the other roller member, second guide means is provided for permitting the other roller member and the connecting member to move relative to each other only in the direction of the second diameter. This enables the above-mentioned one roller member to move in the direction of the first diameter relative to the connecting member, and the other roller member to move in the direction of the second diameter which is orthogonal to the direction, thus permitting the two adjacent roller members to move relative to each other in the orthogonal plane. The first and second guide means may have a desired construction insofar as each guide member permits only the relative movement of the roller member and the connecting member in the diametrical direction. For example, each guide means comprises diametrical slots formed in the connecting member and pin-shaped portions formed on the end face of the roller member and fitted in the respective slots so as to be movable only in the diametrical direction. The guide means is then simple in construction. Instead of the slots, slits or grooves similar thereto may be formed in the connecting member. Alternatively, the grooves or the like may be formed in the end face of the roller member, and the pin-shaped portions on the connecting member.

For example, the support member is in the form of a prism and has fitted therearound a plurality of short cylindrical movable members each formed with a rectangular bore, the support member being inserted through the bore with a clearance formed in the bore in one of its widthwise directions so that the movable member is movable relative to the support member in the above-mentioned one widthwise direction, the roller members being rotatably mounted on the respective movable members externally thereof, the position change-over device being provided between each of the movable members and the support member. The roller member is then reliably shiftable by moving the roller member along the support member which is in the form of a prism. In this case, the position change-over device comprises, for example, an elastic member provided in the support member for biasing the movable member toward one side in the above-mentioned one widthwise direction, a cylinder portion formed in the support member, a piston slidably inserted in the cylinder portion for moving the movable member toward the other side in the above-mentioned one widthwise direction against the biasing force of the elastic member when compressed air is supplied to the cylinder portion, and a change-over valve mounted on the support member for supplying the compressed air to the cylinder portion. The roller member is then shiftable easily and reliably merely by operating the change-over valve. Preferably the elastic member is inserted in a cavity formed in the support member, and the center line of the cavity and the center line of the cylinder are positioned on a straight line extending across the center line of the movable member at right angles therewith. The roller member is then very smoothly movable by the piston and the elastic member, and this greatly shortens the time required for shifting.

For example, the support member is in the form of a cylinder and extends through the plurality of roller members as radially spaced apart therefrom, and the position change-over device comprises a permanent magnet provided on the inner periphery of the roller member and a magnet unit including an electromagnet disposed at an outer peripheral portion of the support member inside the roller member, the roller members being individually shiftable by changing-over the state of current supply to the electromagnets of the respective magnet units, with the permanent magnets on the respective roller members opposed to the respective magnet units on the support member and radially spaced apart therefrom by a predetermined distance. The roller members are then contactlessly and rotatably supported around the support member and are therefore rotatable with greatly diminished resistance. Since each of the roller member and the support member has no portion therebetween which will rotate relative to and in contact with the other, these members require no maintenance procedure. For example in this case, the permanent magnet on the roller member is in the form of a hollow cylinder, and the magnet unit comprises a permanent magnet fixed to the outer periphery of the support member and generally in the form of a partly cut-out hollow cylinder, and the electromagnet fixed to the outer peripheral portion of the support member where the permanent magnet is cut out, the roller member being shiftable by deenergizing the electromagnet or alternatively energizing the electromagnet.

DESCRIPTION OF THE PREFERRED EMBODIMENTS

Several embodiments of the present invention will be described below with reference to the drawings.

FIGS. 1 to 6 show a first embodiment of the invention as applied to the vibrating roller of inking arrangement of a printing press.

Figure 1:
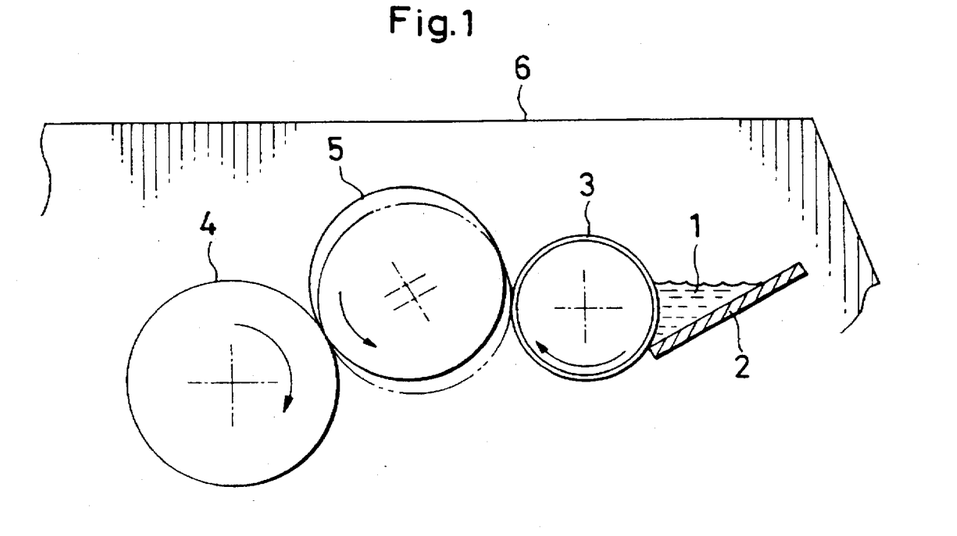
FIG. 1 is a schematic side elevation partly broken away of the inking arrangement of a printing press to show a first embodiment of the invention.
Figure 2:
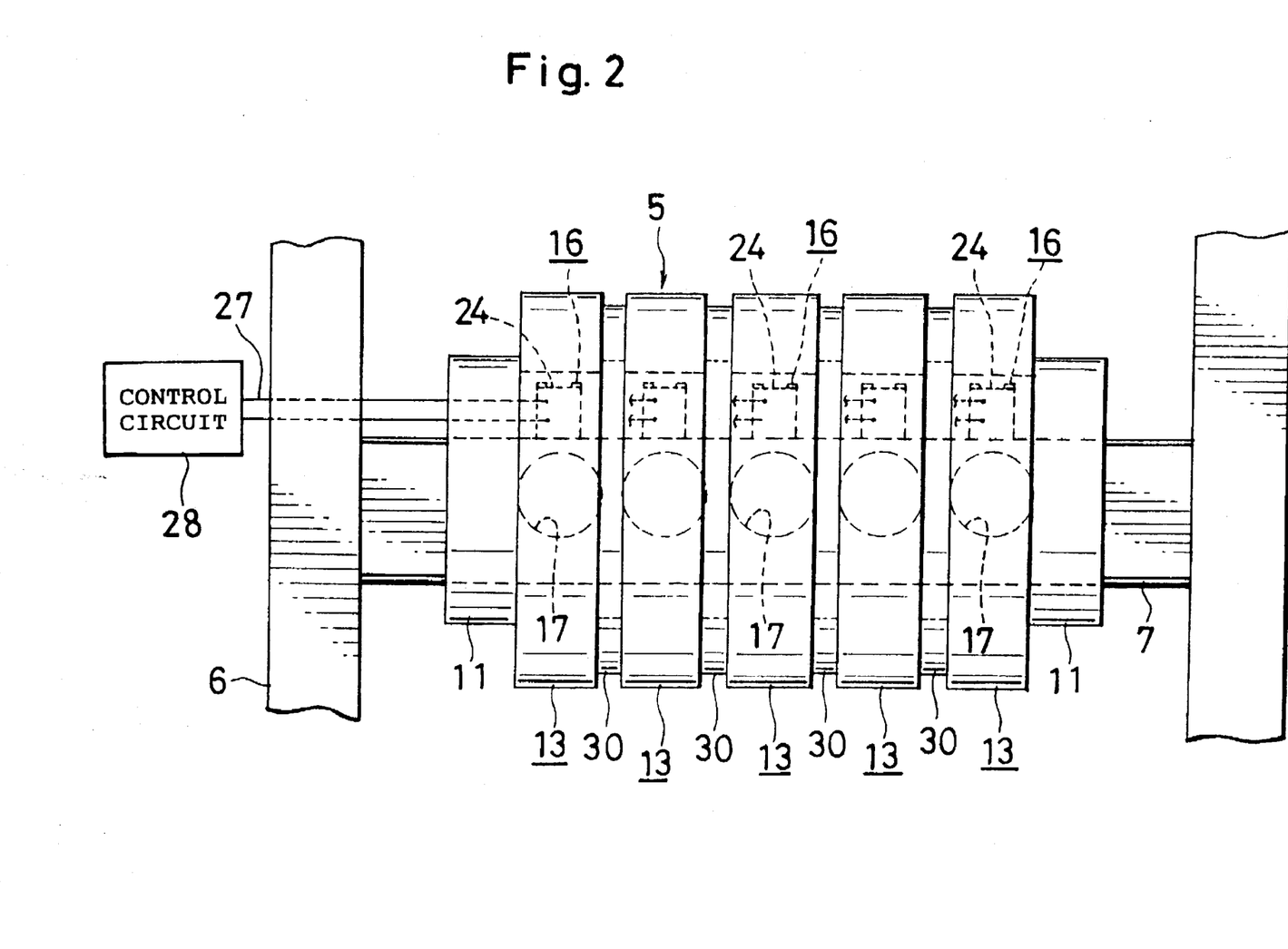
FIG. 2 is an enlarged plan view showing a portion of the inking arrangement including a vibrating roller.
Figure 3:
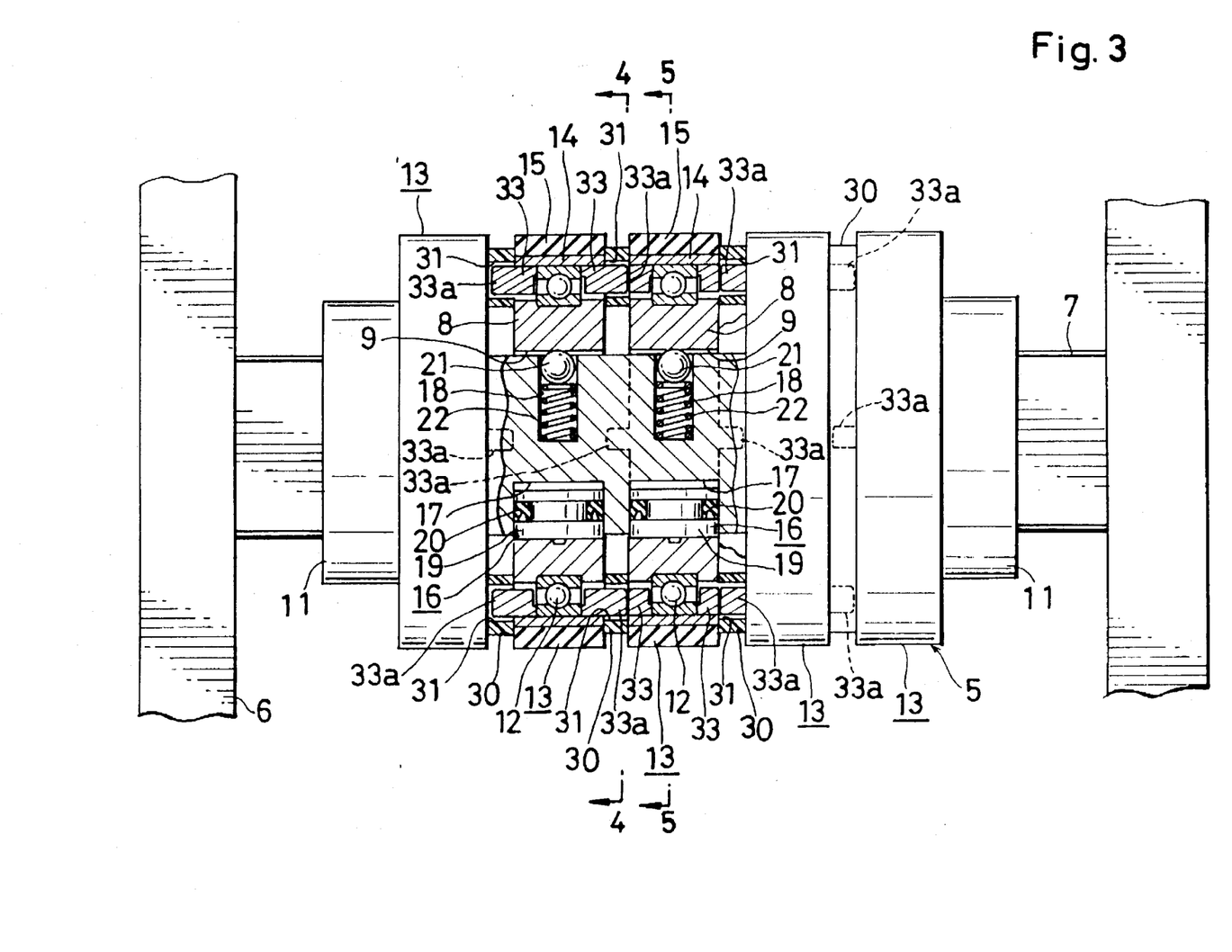
FIG. 3 is a fragmentary front view of the vibrating roller.

FIG. 1 schematically shows part of the inking arrangement of the printing press. FIG. 2 is an enlarged plan view showing a portion of FIG. 1 as seen from above, and FIG. 3 is an enlarged front view partly broken away and showing the portion of FIG. 2 as it is seen from the front. The vertical direction of FIG. 1 approximately matches the vertical direction of the printing press. In the description of the first embodiment, the left-hand side of FIG. 1 will be referred to as "front," the right-hand side thereof as "rear," and the terms "right" and "left" are used for the arrangement as it is seen from the front rearward. Accordingly, the lower side of FIG. 2 is front and the upper side thereof is rear. The right and left of FIGS. 2 and 3 correspond to the right and left of the arrangement, respectively.

With reference to FIG. 1, an ink fountain roller 3 is disposed close to the front end of a plate (doctor blade) 2 providing the bottom of an ink fountain 1 and adapted to control the amount of ink. Disposed in front of the roller 3 is the first 4 of ink distributing rollers. A vibrating roller 5 is disposed between the fountain roller 3 and the distributing roller 4. These rollers 3, 4, 5 have their axes arranged in parallel to one another and extend in the right-to-left direction. The fountain roller 3 and the distributing roller 4 are rotatably supported by a frame 6 of the printing press and are each rotated in the direction of the corresponding arrow in FIG. 1 at a predetermined speed as timed with the other, by unillustrated drive means.

Figure 4:
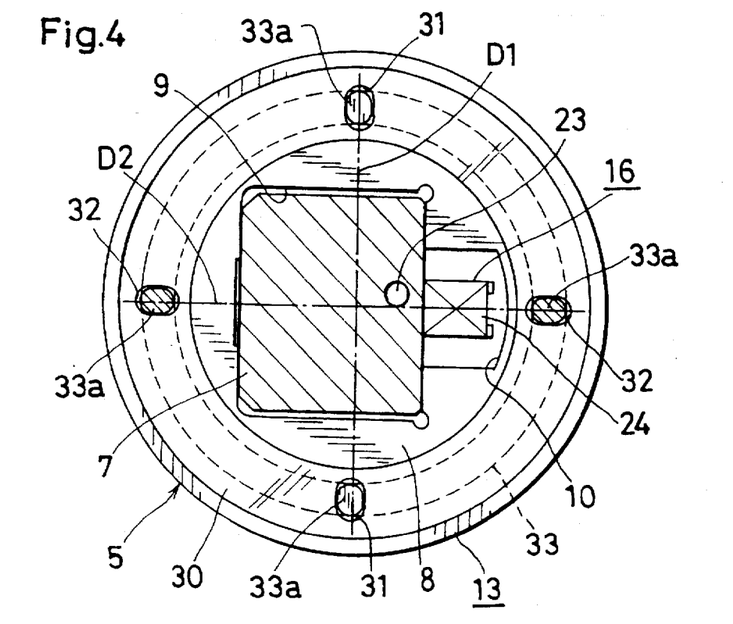
FIG. 4 is a view in section taken along the line IV—IV in FIG. 3.
Figure 5:
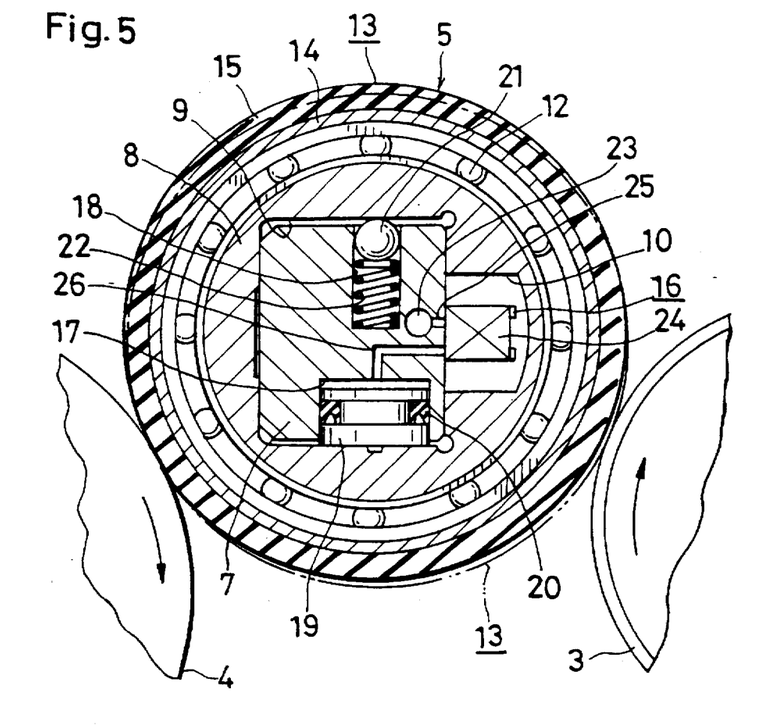
FIG. 5 is a view in section taken along the line V—V in FIG. 3.
Figure 6:
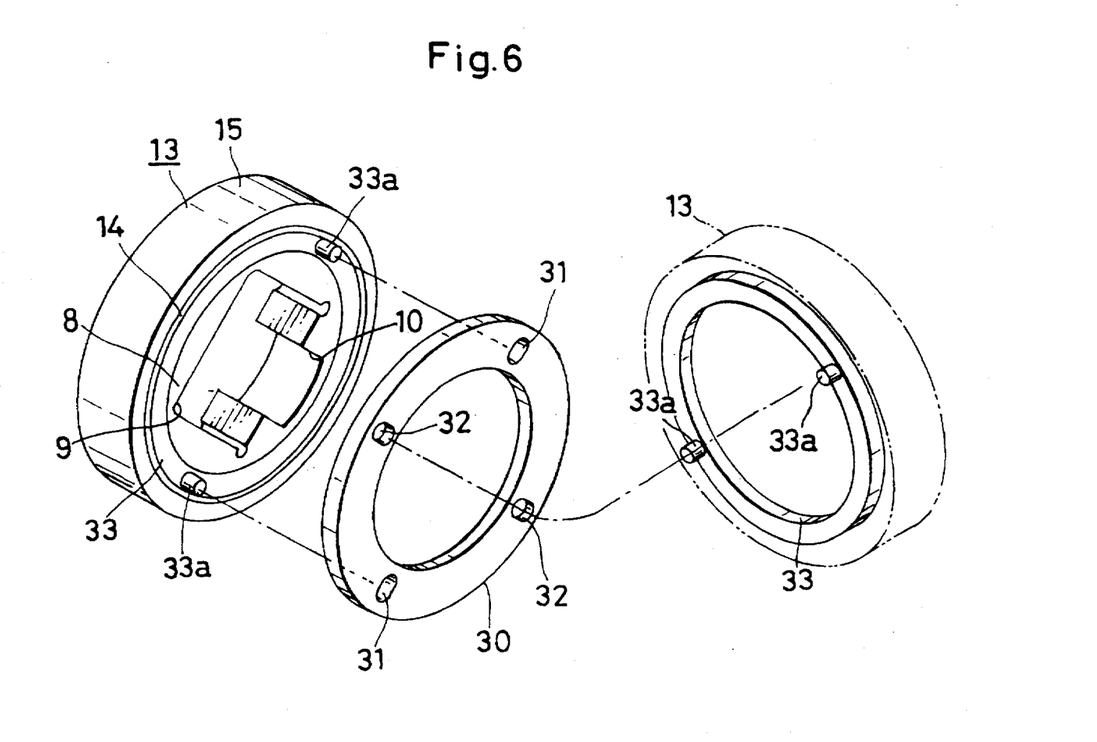
FIG. 6 is an exploded perspective view of a roller member and a connecting member which are included in the vibrating roller.

The overall construction of the vibrating roller 5 is shown in FIGS. 2 and 3. The construction of components thereof is shown in FIGS. 4 and 5. The construction of the vibrating roller 5 will be described as an example with reference to these drawings.

A support member 7 extending in the right-to-left direction has its opposite ends fixed to the frame 6. A plurality of, e.g., five, movable members 8 are provided around the support member 7. The support member 7 is in the form of a prism having a vertical width larger than its front-to-rear width. The movable member 8 is in the form of a short cylinder and formed with a relatively large rectangular bore 9 axially extending therethrough. A groove 10 extending over the entire length of the movable member 8 is formed in the rear wall defining the bore 9, the groove 10 being positioned in the middle of vertical width of the wall. Between a pair of right and left disklike positioning members 11 secured to the support member 7, the movable members 8 are axially arranged at a predetermined spacing. The support member 7 is inserted through the bores 9 of these movable members 8. The bore 9 in the movable member 8 has a front-to-rear width approximately equal to the front-to-rear width of the support member 7. The front and rear walls of the member 8 defining the bore 9 are slidable in contact with the front and rear surfaces of the support member 7. The bore 9 has a vertical width slightly larger than the vertical width of the support member 7. The movable member 8 is movable upward or downward between an upper limit position where the lower wall defining the bore 9 is in contact with the lower surface of the support member 7 and a lower limit position where the upper wall defining the bore 10 is in contact with the upper surface of the support member 7. The outer end faces of the movable members 8 at the right and left ends are merely slidable in contact with end faces of the respective positioning members 11, and the adjacent movable members 8 are spaced apart from each other, so that the movable members 8 are individually movable upward or downward. A ball bearing 12 has an inner ring secured to the outer periphery of each movable member 8 and an outer ring fixedly carrying thereon a roller member 13 in the form of a hollow cylinder. The roller member 13 comprises a metal sleeve 14 fixedly fitted around the outer ring of the bearing 12, and a rubber hollow cylinder 15 having a large wall thickness and fixedly fitted around the sleeve 14. Since the roller member 13 is attached to the movable member 8 with the bearing 12 interposed therebetween, the roller member 13 is freely rotatable relative to the movable member 8 but is not movable relative to the movable member 12 in a plane orthogonal to the axial direction (plane containing a vertical axis and an axis in the front-to-rear direction). Accordingly, the roller member 13 is movable between the upper limit position and the lower limit position with the upward or downward movement of the movable member 8.

A position change-over device 16 for the roller member 13 is provided between the movable member 8 and the support member 7 as will be described below. The portion of the support member 7 corresponding to the axial midportion of the movable member 8 is formed with a cylinder portion 17 extending upward from the lower surface and a spring cavity 18 extending downward from the upper surface. A piston 19 is vertically slidably inserted in the cylinder portion 17 with a seal 20 disposed therebetween. A ball 21 is vertically slidably inserted in an upper portion of the spring cavity 18. Inserted in the cavity 18 between its bottom and the ball 21 is a coiled compression spring 22 serving as an elastic member for biasing the ball 21 upward. The center line of the cylinder portion 17 and the center line of the spring cavity 18 are positioned on a straight line extending across the center line of the movable member 8 at right angles therewith. The support member 7 is formed with an air supply channel 23 extending axially thereof, and one end of the channel 23 is in communication with an unillustrated source of compressed air. A solenoid valve 24 serving as a change-over valve is attached to the front surface of the support member 7 opposed to the groove 10 in the movable member 8. The valve 24 has two ports communicating respectively with the air supply channel 23 and the cylinder portion 17 via communication passages 25, 26 formed in the support member 7. The valve 24 further has electric wires 27 extending to the outside through the grooves 10 and connected to a control circuit 28. When the valve 24 is energized (on state), the cylinder portion 17 is caused to communicate with the air supply channel 23 via the valve 24. When the valve 24 is deenergized (off state), the cylinder portion 17 is caused to communicate with the atmosphere via the valve 24. The roller members 13 are individually shiftable upward or downward by changing over the valves 24 of the changeover devices 16 individually for energization or deenergization by the control circuit 28. Stated more specifically, when the valve 24 is switched to the off state, the cylinder portion 17 is caused to communicate with the atmosphere, thereby rendering the piston 19 free to move in the cylinder portion 17. The spring 22 therefore causes the ball 21 to move the movable member 8 upward, consequently shifting the movable member 8 and the roller member 13 to the upper limit position. When the valve 24 is switched to the on state, the cylinder portion 17 is caused to communicate with the air supply channel 23 and further with the compressed air source via the channel, so that compressed air is supplied to the cylinder portion 17. Accordingly, the piston 17 projects downward from the support member 7 against the force of the spring 22, thereby moving the movable member 8 downward and consequently shifting the member 8 and the roller member 13 to the lower limit position. Since the center line of the cylinder portion 17 and the center line of the spring cavity 18 are positioned on a straight line extending across the center line of the movable member 8 at right angles therewith, the roller member 13 is movable very smoothly by the piston 19 or spring 22 upon changing over the valve 24, and is therefore shiftable within a greatly shortened period of time.

A connecting member 30 is interposed between each two adjacent roller members 13. The construction of the connecting member 30 and the relationship between this member and the roller member 13 are shown in detail in the sectional view of FIG. 4 and the exploded perspective view of FIG. 6. The connecting member 30 is in the form of an apertured disk. The connecting member 30 has an inside diameter slightly smaller than the outside diameter of the movable member 8, and the inner periphery of the connecting member 30 is spaced apart from the support member 7 by a relatively large distance. The connecting member 30 has an outside diameter which is intermediate between the inside diameter and the outside diameter of the roller member 13. At symmetric two portions of the connecting member 30 on an optional diameter D1 thereof, the member 30 is formed with a first slot 31 having a short length along the diameter D1. The diameter will be referred to as a first diameter D1. On a second diameter D2 orthogonal to the first diameter D1, the connecting member 30 is formed with second slots 32 having a short length along the diameter D2. Two metal rings 33 holding the outer ring of the bearing 12 at its opposite sides are fitted respectively to opposite ends of the roller member 13 and positioned inside the sleeve 14. The outer end face of the ring 33 is flush with the corresponding end face of the roller member 13 or is positioned slightly inwardly thereof. At each of symmetric two portions of the ring 33 on a diameter thereof, the ring 33 is integrally formed with a pin (pin-shaped portion) 33a projecting outward beyond the end face of the roller member 13. The two pins 33a on the roller member 13 at one side of the connecting member 30 are fitted respectively in the two first slots 31 in the member 30, and the roller member 13 is movable relative to the connecting member 30 only in the direction of the first diameter D1 by being guided by the first slots 31. The two pins 33a on the roller member 13 at the other side of the connecting member 30 are fitted respectively in the two second slots 32 in the member 30, and the roller member 13 is movable relative to the connecting member 30 only in the direction of the second diameter D2 by being guided by the second slots 32. The first slots 31 of the connecting member 30 and the pins 33a formed on one of the adjacent two roller members 13 and fitted in the slots 31 provide first guide means permitting this roller member 13 and the connecting member 30 to move relative to each other only in the direction of the first diameter D1. The second slots 32 of the connecting member 30 and the pins 33a formed on the other roller member 13 and fitted in the slots 32 constitute second guide means permitting the relative movement of this roller member 13 and the connecting member 30 only in the direction of the second diameter D2. The roller member 13 at one side of the connecting member 30 is movable relative to the connecting member 30 only in the direction of the first diameter D1, and the roller member 13 at the other side of the connecting member 30 is movable relative to the member 30 only in the direction of the second diameter D2. These two roller members 13 are therefore so connected together by the member 30 that they are movable relative to each other in a plane orthogonal to the axial direction but immovable in the circumferential direction (unrotatable) relative to each other. With the present invention, however, the roller members 13 are restrained by the support member 7 so as to be movable only upward or downward, with the result that the adjacent two roller members 13 are movable relative to each other only upward or downward.

According to the present embodiment, the rings 33 at opposite ends of each roller member 13 are in match with each other with respect to the circumferential position of the pins 33a, whereas the position relationship therebetween is variable as desired.

Each roller member 13 of the vibrating roller 5 is shifted to the upper limit position or alternatively to the lower limit position while being held in contact with the distributing roller 4 at all times. The roller member 13 moves out of contact with the ink fountain roller 3 when shifted to the upper limit position, or moves into contact with the fountain roller 3 when shifted to the lower limit position. Since the roller member 13 is always in contact with the distributing roller 4, the member 13 is rotated by friction at the same peripheral speed as the roller 4 in the direction of the arrow shown in FIG. 1. Each two adjacent roller members 13 are connected together by the connecting member 30 so as not to rotate relative to each other circumferentially thereof, with the result that all the roller members 30 rotate together at the same speed. Because the connecting member 30 permits the relative movement of the two adjacent roller members 13 within a plane orthogonal to the axial direction, the roller members 13 are individually shifted to the upper limit position or alternatively to the lower limit position while rotating in contact with the distributing roller 4.

The ink within the ink fountain 1 flows out onto the surface of the fountain roller 3 through a clearance between the control plate 2 and the roller 3. At this time, the thickness of film of the ink, i.e., the amount of ink, to be supplied to the surface of the fountain roller 3 can be controlled by adjusting the clearance between the roller 3 and the control plate 2. While the roller member 13 as shifted to the lower limit position is in contact with the fountain roller 3, the ink applied to the surface of the fountain roller 3 is transferred to the surface of the roller member 13. The ink transferred to the surface of the member 13 is transferred to the corresponding portion of the surface of the distributing roller 4 which is in contact with the member 13 at all times. The ink on the distributing roller 4 is further supplied to the printing surface via a plurality of distributing rollers, etc. The control circuit 28 controls the periods of time during which each roller member 13 is held in the upper limit position and the lower limit position, respectively, whereby the amount of ink to be supplied to the printing surface is adjusted for the particular position with respect to the widthwise direction of the surface. All the roller members 13 of the vibrating roller 5 rotate at the same speed, so that the amount of ink to be supplied to the printing surface is accurately controllable to a desired value at the position of each roller member 13, i.e., from position to position widthwise of the printing surface, merely by controlling the lengths of time during which each roller member 13 is held respectively in the upper limit position and the lower limit position.

With the present embodiment, the roller member 13 is adapted to contact the distributing roller 4 only when shifted to the upper limit position (first position) and to contact both the distributing roller 4 and the fountain roller 3 at the same time when shifted to the lower limit position (second position), whereas the roller member 13 can be adapted to contact the fountain roller 3 only when shifted to the first position and to contact the distributing roller 4 only when shifted to the second position. The roller member 13 then comes into contact with the fountain roller 3 and the distributing roller 4 alternately, is unable to contact with both the rollers at the same time, and is therefore unable to transfer the ink to the distributing roller 4 during the transfer of ink from the fountain roller 3 to the roller member 13. Conversely, the ink can not be transferred from the fountain roller 3 to the roller member 13 during the transfer of ink from the roller member 13 to the distributing roller 4. For this reason, the ratio of the time during which the ink can be transferred from the fountain roller 3 to the distributing roller 4 to the entire operating time is ½ if greatest. Accordingly, although the ink can be satisfactorily supplied of light printing involving the use of a small amount of ink, the required amount of ink cna not be supplied for heaving printing necessitating a large amount of ink, consequently giving rise to the problem that the prints exhibit a poor finish due to a low ink density. Another problem arises in that the supply of ink is insufficient even for light printing if the printing speed is high.

In the case of the present embodiment, on the other hand, the roller member 13 is always in contact with the distributing roller 4, and is in contact with both the distributing roller 4 and the fountain roller 3 at the same time when in the lower limit position. Accordingly, the ratio of the time during which the ink can be transferred from the fountain roller 3 to the distributing roller 4 to the entire operating time can be 1 if greatest. This ensures the supply of required amounts of ink for heavy printing and high-speed printing.

Figure 7:
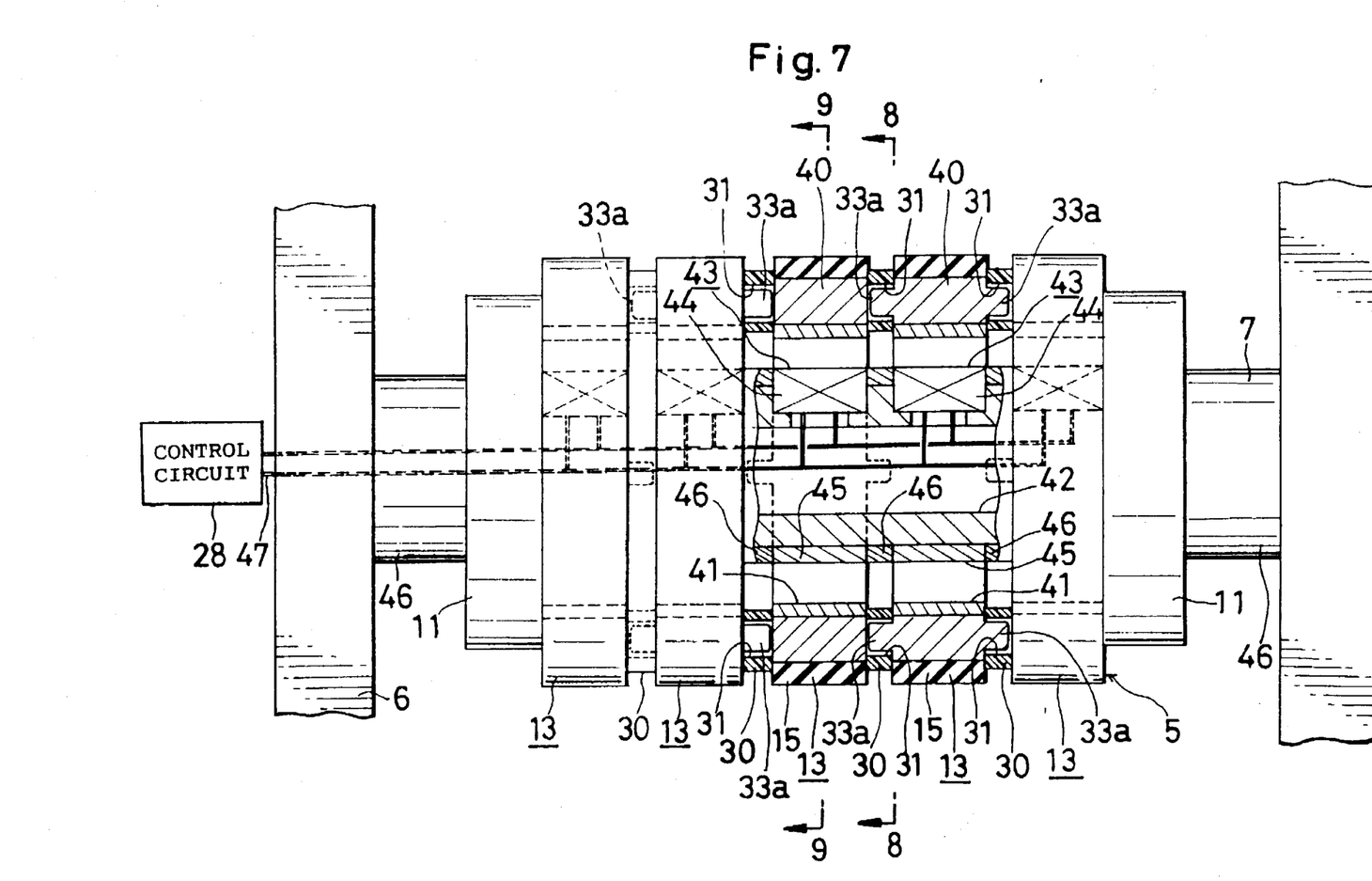
FIG. 7 is a fragmentary front view showing a second embodiment of the invention, i.e., a vibrating roller.
Figure 8:
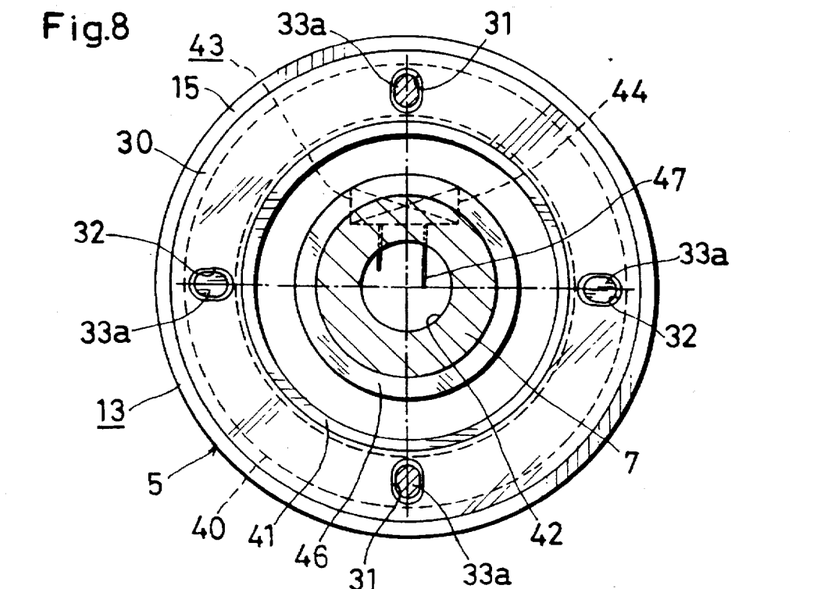
FIG. 8 is a view in section taken along the line VIII—VIII in FIG. 7.
Figure 9:
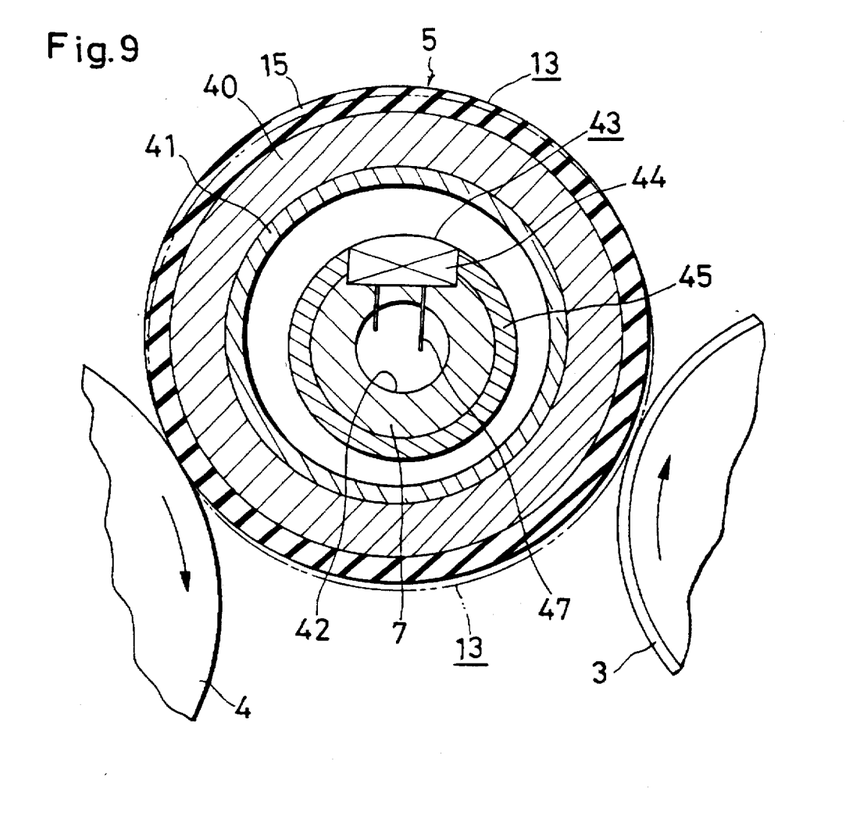
FIG. 9 is a view in section taken along the line IX—IX in FIG. 7.

FIGS. 7 to 9 show a second embodiment of the invention as applied to the vibrating roller of inking arrangement of the printing press.

FIG. 7 is a fragmentary front view of a vibrating roller 5 as it is seen from the front, and FIGS. 8 and 9 are views in two sections indicated in FIG. 7 and as seen from the right side. The up-down direction of these drawings are generally in match with the up-down direction of the printing press. In the description of the second embodiment, the left-hand side of FIGS. 8 and 9 will be referred to as "front," and the right-hand side thereof as "rear," and the terms "right" and "left" are used for the roller as it is seen from the front rearward. Thus, the right and left of FIG. 8 will be referred to each as such.

The portion of the second embodiment other than the vibrating roller 5 is the same as in the first embodiment and therefore will not be described again. Throughout the drawings showing the vibrating rollers of the first and second embodiments, like parts are designated by like reference numerals.

In the case of the second embodiment as in the first, connecting members 30 are held between a plurality of roller members 13, and a support member 7 extends through the assembly and is spaced apart from the assembly radially thereof by a considerable distance. The roller members 13 and the connecting members 30 are held between a pair of right and left positioning members 11 fixed to the support member 7, whereby the members are positioned in place with respect to the right-to-left direction.

The connecting member 30 is the same as in the first embodiment. The roller member 13 comprises a support ring 40 in the form of a short hollow cylinder having a large wall thickness, and a rubber hollow cylinder 15 having a large wall thickness and fitted around the ring 40. A hollow cylindrical permanent magnet 41 constituting a position change-over device is fitted in the ring 40. The two roller members 13 at the right and left ends each have a fiat end face opposed to the positioning member 11 and slidable in contact with the inner end face of the positioning member 11 to render the member 13 movable radially thereof. The end faces of the roller members 13 except for the two flat end faces are each integrally formed with pins 33a projecting from the end face of the roller member 13 and positioned respectively at symmetric two portions on a diameter of the member 13. As in the case of the first embodiment, the pins 33a are fitted in corresponding slots 31 or 32 in the connecting member 30 adjacent to the member 13 so as to be movable only in the direction of the diameter. Thus, each two adjacent roller members 13 are connected together by the connecting member 30 so as to be movable relative to each other within a plane orthogonal to the axial direction but unrotatable relative to each other.

The support member 7 is cylindrical and has a central circular bore 42. A magnet unit 43 constituting the position change-over device for each roller member 13 is provided at an outer peripheral portion of the support member 7 inside the roller member 13. The magnet unit 43 comprises an electromagnet 44 and an approximately hollow cylindrical permanent magnet 45. Sleeves 46 and such permanent magnets 45, which have the same diameter, are alternately fitted around the support member 7, whereby the magnets 45 are fixedly positioned in place. Each permanent magnet 45 is partly cut out at its upper side, and the electromagnet 44 is fixed to the outer peripheral portion of the support member 7 where the permanent magnet 45 is cut out. The magnet 45 and the electromagnet 44 are combined into a hollow cylinder. The outside diameter of the magnet unit 45 is considerably smaller than the inside diameter of the permanent magnet 41 on the roller member 13, and the unit 43 is spaced apart from the magnet 41 radially by a distance. The sleeve 46 has an outside diameter considerably smaller than the inside diameter of the connecting member 30 which is positioned externally of the sleeve, and is also spaced apart from the member 30 radially. The roller member 13 and the connecting member 30 are radially freely movable relative to the support member 7. The electromagnets 44 have electric wires 47 extending to the outside of the support member 7 through the bore 42 of the member 7 and connected to a control circuit 28. The permanent magnets 41, 45 have on the inner periphery and outer periphery thereof magnetic poles, the polarity of which is so determined that the permanent magnets 41 of the roller members 13 exert a repulsive force on each other and are subjected to a repulsive force from the permanent magnets 45 of the magnet units 43. For example, the permanent magnet 41 of the roller member 13 has an N pole at its inner periphery and an S pole at its outer periphery, and the permanent magnet 45 of the magnet unit 43 has an N pole at its outer periphery and an S pole at its inner periphery.

Each roller member 13 is positioned in place with respect to the radial direction, with the permanent magnet 41 radially spaced apart from and opposed to the corresponding magnet unit 43 by the repulsive force of the magnet unit 43. The roller members 13 are individually shifted to an upper first position or alternatively to a lower second position by changing over the state of the respective magnet units 43, i.e., by changing over the respective electromagnets 44 for energization or deenergization. The roller member 13 is shifted to the first position or the second position while being in contact with the distributing roller 4 at all times. The member 13 moves out of contact with the fountain roller 3 when shifted to the first position and comes into contact with the fountain roller 3 when shifted to the second position. The electromagnet 44 is deenergized (off state), or alternatively energized (on state) so that the magnet 44 has an N pole at its outer side and an S pole at its inner side. When the electromagnet 44 is in off state, the roller member 13 is in the second position as indicated in a broken line in FIG. 9 and held in contact with both the distributing roller 4 and the fountain roller 3. At this time, the repulsive force of the permanent magnet 45 of the magnet unit 43, the pressure of the distributing roller 4 and the pressure of the fountain roller 3 are in balance, holding the roller member 13 in the second position. When the electromagnet 44 is changed over to on state, the permanent magnet 41 of the roller member 13 is acted on by an upward repulsive force of the electromagnet 44, whereby the roller member 13 is moved toward the upper position. Consequently, the roller member 13 is shifted to the first position as indicated in a solid line in FIG. 9, whereby the member 13 is moved out of contact with the fountain roller 3. At this time, the repulsive forces of the permanent magnet 45 of the magnet unit 43 and the electromagnet 44 and the pressure of the distributing roller 4 are in balance, holding the roller member 13 in the second position. When changed over to off state, the electromagnet 44 no longer produces a repulsive force, permitting the roller member 13 to move downward to the second position and to come into contact with the fountain roller 3. As is the case with the first embodiment, all the roller members 13 of the vibrating roller are rotatable at the same speed also in this case, and the roller members 13 are individually shiftable to the first position or to the second position by individually changing over the state of the magnet units 43 by the control circuit 28. In either of the first and second positions, the roller member 13 and the connecting member 30 are held out of contact with the magnet unit 43 and sleeve 46 on the support member 7, and are therefore rotatable with greatly diminished resistance.

Except for the above feature, the second embodiment is the same as the first, and like parts are designated by like reference numerals.

According to the embodiment described above, the roller member 13 of the vibrating roller 5 is shiftable to a position away from the fountain roller 3 or to a position in contact with the fountain roller 3 while in contact with the distributing roller 4 at all times. However, the roller member may be made shiftable to a position where it is in contact with the fountain roller and away from the distributing roller, or to a position where it is in contact with the distributing roller and away from the fountain roller.

Although the roller member 13 is driven by friction according to the above embodiment, all the roller members 13 can be made forcibly rotatable by driving the roller member 13 at one end by suitable drive means.

The present invention is applicable not only to vibrating rollers for printing press inking arrangements but also to desired rollers such as water quantity adjusting rollers for water supply devices of printing presses and tension rollers for roll paper feeders of printing presses.

Figure 10:
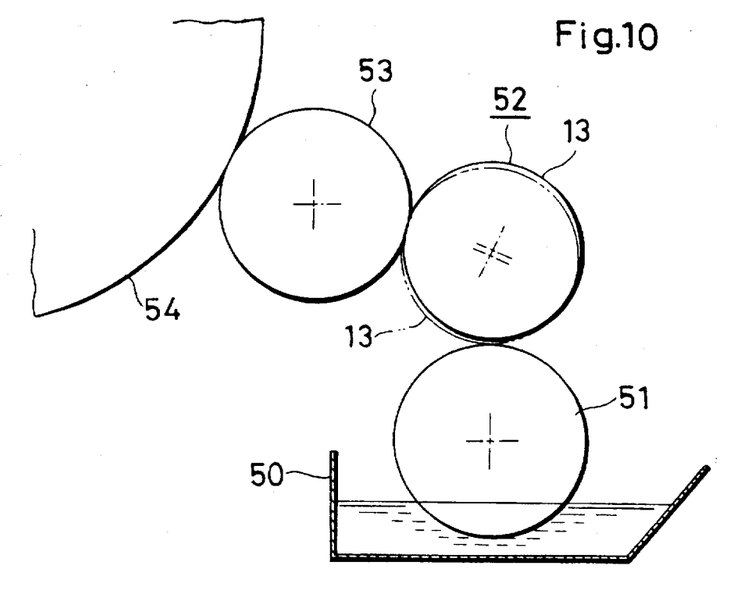
FIG. 10 is a schematic perspective view of a water supply device included in the printing press to show a third embodiment of the invention.

FIG. 10 shows a third embodiment of the invention as a water quantity adjusting roller for the water supply device of the printing press.

FIG. 10 is a fragmentary view schematically showing the water supply device. Indicated at 50 is a water tank, at 51 a water fountain roller, at 52 the water quantity adjusting roller, at 53 a water applicator roller of rubber and at 54 a plate drum. The adjusting roller 52 has the same construction as the vibrating roller 5 of the foregoing embodiment. Each of the roller members 13 of the adjusting roller 52 is shiftable to a position away from the water fountain roller 51 or to a position in contact with the water fountain roller 51 while always in contact with the water applicator roller. The quantity of water to be supplied from the tank 50 to the plate drum 54 via the fountain roller 51, adjusting roller 52 and applicator roller 53 is controlled to a desired value from position to position widthwise of the printing surface by adjusting the time during which the roller member 13 is in contact with the fountain roller, the adjustment being made for each member 13 individually.

Figure 11:
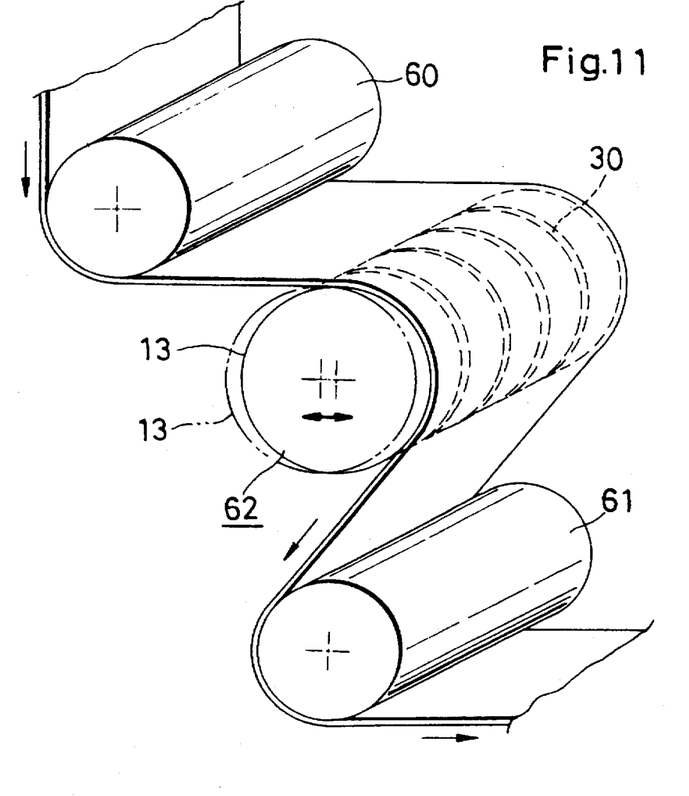
FIG. 11 is a schematic perspective view of a roll paper feeder included in the printing press to show a fourth embodiment of the invention.

FIG. 11 shows a third embodiment of the invention as applied to the tension roller of roll paper feeder of the printing press.

FIG. 11 is a fragmentary view schematically showing the paper feeder. The drawing shows guide rollers 60, 61, a tension roller 62 interposed therebetween, and roll paper 63 passed around these rollers 60, 62, 61 so as to be sent forward. The tension roller 62 has the same construction as the vibrating roller 5 of the foregoing embodiment, and like parts are designated by like reference numerals. Each of roller members 13 of the tension roller 62 is shiftable to a front limit position at the right-hand side of the drawing, or alternatively to a rear limit position at the left-hand side thereof, and can be fixed in these positions. When the roller member 13 is shifted to the front limit position, an increased tension acts on the portion of the roll paper 63 around the member, while when the roller member 13 is shifted to the rear limit position, the tension on the portion of the paper 63 around the member decreases. The tension on the roll paper 63 is adjustable from portion to portion widthwise thereof by suitably determining the front and rear positions for each of the roller members 13, whereby the roll paper 63 can be prevented from traveling zigzag.

What is claimed is:

1. A roller comprising a straight support member, a plurality of hollow cylindrical roller members arranged axially thereof and having the support member inserted therethrough, and a position change-over device provided for each of the roller members, each of the roller members being provided around the support member so as to be rotatable relative to the support member and movable relative thereto in a plane orthogonal to the axial direction, the position change-over device being adapted to shift the roller members respectively each in the plane orthogonal to the axial direction of the roller member, the roller being characterized in that a connecting member is interposed between opposed end faces of each two adjacent roller members for preventing the two adjacent roller members from moving circumferentially thereof relative to each other while permitting relative movement of the two adjacent roller members in the plane orthogonal to the axial direction.

2. A roller as defined in claim 1 which is characterized in that the connecting member is in the form of an apertured disk.

3. A roller as defined in claim 2 which is characterized in that between two symmetric portions of the connecting member on a first diameter thereof and said end face, opposed to these portions, of one of the two adjacent roller members, first guide means is provided for permitting said one roller member and the connecting member to move relative to each other only in the direction of the first diameter, and between two symmetric portions of the connecting member on a second diameter thereof and said end face, opposed to these portions, of the other roller member, second guide means is provided for permitting said other roller member and the connecting member to move relative to each other only in the direction of the second diameter.

4. A roller as defined in claim 3 which is characterized in that each of the guide means comprises diametrical slots formed in the connecting member and pin-shaped portions formed on said end face of the roller member and fitted in the respective slots so as to be movable only in the diametrical direction.

5. A roller as defined in claim 1 which is characterized in that the support member is in the form of a prism and has fitted therearound a plurality of short cylindrical movable members each formed with a rectangular bore, the support member being inserted through the bore with a clearance formed in the bore in one of its widthwise directions so that the movable member is movable relative to the support member in said one widthwise direction, the roller members being rotatably mounted on the respective movable members externally thereof, the position change-over device being provided between each of the movable members and the support member.

6. A roller as defined in claim 5 which is characterized in that the position change-over device comprises an elastic member provided in the support member for biasing the movable member toward one side in said one widthwise direction, a cylinder portion formed in the support member, a piston slidably inserted in the cylinder portion for moving the movable member toward the other side in said one widthwise direction against the biasing force of the elastic member when compressed air is supplied to the cylinder portion, and a change-over valve mounted on the support member for supplying the compressed air to the cylinder portion.

7. A roller as defined in claim 6 which is characterized in that the elastic member is inserted in a cavity formed in the support member, and the center line of the cavity and the center line of the cylinder are positioned on a straight line extending across the center line of the movable member at right angles therewith.

8. A roller as defined in claim 1 which is characterized in that the support member is in the form of a cylinder and extends through the plurality of roller members as radially spaced apart therefrom, and the position change-over device comprises a permanent magnet provided on the inner periphery of the roller member and a magnet unit including an electromagnet disposed at an outer peripheral portion of the support member inside the roller member, the roller members being individually shiftable by changing-over the state of current supply to the electromagnets of the respective magnet units, with the permanent magnets on the respective roller members opposed to the respective magnet units on the support member and radially spaced apart therefrom by a predetermined distance.

9. A roller as defined in claim 8 which is characterized in that the permanent magnet on the roller member is in the form of a hollow cylinder, and the magnet unit comprises a permanent magnet fixed to the outer periphery of the support member and generally in the form of a partly cut-out hollow cylinder, and the electromagnet fixed to the outer peripheral portion of the support member where the permanent magnet is cut out, the roller member being shiftable by deenergizing the electromagnet or alternatively energizing the electromagnet.

* * * * *